Figure 1:
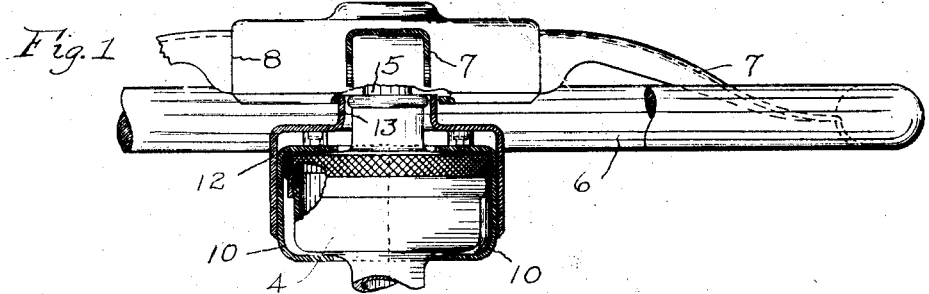
Figure 2:
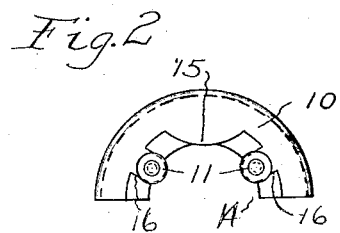
Figure 3:
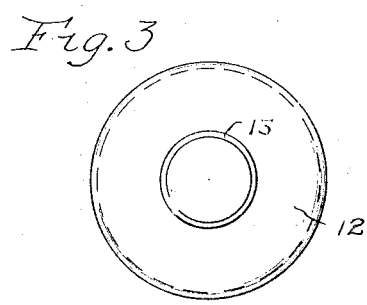

July 20, 1926.

W. P. SENG 1,592,992

GEAR HOUSING PROTECTOR

Filed July 5, 1922

INVENTOR:
Wendelin P. Seng
BY Kent W. Tromell
ATTORNEY.

Patented July 20, 1926.

1,592,992

UNITED STATES PATENT OFFICE.

WENDELIN P. SENG, OF WILMETTE, ILLINOIS.

GEAR-HOUSING PROTECTOR.

Application filed July 5, 1922. Serial No. 572,811.

This invention relates particularly to a protector for the gear case of an automobile steering wheel, and more particularly to a steering wheel of the lock type in which the wheel proper may be locked or unlocked with respect to the steering mechanism. A further object of the invention is to provide a new and improved protector of this kind which is simple in construction and application, difficult to remove, except in an authorized manner, and yet is effective and efficient in operation.

A certain type of automobile has a steering column which includes a gear case 4 from the upper end of which a shaft 5 projects and to which a steering wheel 6 is attachable. This steering wheel has rotating pressed metal spokes 7 and a central hub casing 8 in which is a locking device (not shown) for removably securing the wheel to the shaft 5.

If access can be had to the interior of the gear case housing 4, it is possible to operate the steering mechanism even if the steering wheel 6 is unlocked from the shaft 5, and for this reason it is necessary to protect the gear case housing 4 so that it cannot be entered from the bottom or sides without practically destroying the upper end of the steering column. In the present invention the protection of the housing 4 is accomplished by providing two semi-circular cover parts 10, made of sheet metal, stampings, or the like, and adapted to fit closely over the top and bottom of the housing 4 and each carrying yielding washers 11, of rubber or the like on its upper face. A circular cover 12 having a reduced neck 13 fits closely over the parts 10 and downwardly over the sides thereof nearly to the bottom, the shouldered portion which forms the neck 13 resting upon the washers 11 thereby properly spacing the semi-circular parts from the casing 12 and preventing the parts from rattling. The upper end of the neck portion 13 preferably extends within the bottom of the hub member 8 of the wheel and these parts all fit so closely together that no sufficient space is left between them for the insertion of an instrument for forcing them apart. The protecting members 10 and 12 are preferably formed up out of stamped metal and all of them may be hardened so as to prevent the use of any ordinary tool in an unauthorized attempt to separate the parts. In forming up the parts 10 the lower edge 14 is made semi-circular fitting closely at the bottom of the housing 4 and the upper edge is formed with tongues 15 and 16 which have some resilience for bearing on the top of the steering gear housing, and thus to accommodate a slight variation in thickness, the tongues 16 providing a support for the washers 11.

In removing the protector it is necessary first to remove the steering wheel whereupon the circular casing 12 can be lifted from its engagement with the semi-circular parts 10 and as soon as it is clear of them they can be separated laterally. When these parts are preferably fitted and hardened it is practically impossible to break into the housing 4 which therefore protects the steering gears against unauthorized access thereto.

I claim:

1. A gear housing protector comprising a pair of hollow segmental parts adapted to fit together, around, above, and below the housing to be protected, and a cover fitting closely over said parts and downwardly over the outer sides thereof so that the cover must be raised free from the segmental parts to disengage them from a housing so protected.

2. A protector for a housing having a removable cap, said protector comprising a plurality of parts, all of which extend over the top and bottom of a housing and together cover the entire exposed outer surface, and a cover slidable downwardly over the parts binding them closely in place and preventing removal of any part until the cover is raised sufficiently to free all parts from engagement therewith.

WENDELIN P. SENG.